United States Patent Office 3,418,127
Patented Dec. 24, 1968

3,418,127
METHOD OF MAKING FLUORESCENT COATING FOR PHOTOGRAPHIC ELEMENTS
Allan G. Millikan, Rochester, N.Y., assignor to Eastman Kodak Company, Rochester, N.Y., a corporation of New Jersey
No Drawing. Continuation-in-part of application Ser. No. 389,457, Aug. 13, 1964. This application May 3, 1965, Ser. No. 452,854
11 Claims. (Cl. 96—82)

ABSTRACT OF THE DISCLOSURE

Method of making fluorescent coatings for photographic elements comprising organic fluorescent compound in emulsion polymerized organic resin latex comprising dispersing fluor in aqueous dispersion of the monomer then polymerizing by emulsion polymerization technique. Product has extremely fine dispersion of fluor in the latex. The fluorescent latex is especially suitable for coating a fluorescent layer over a photographic silver halide emulsion, for example, in making a direct-electron recording film, and provides improved fluorescent efficiency over previously described fluorescent layers for such films.

---

This is a continuation-in-part of my U.S. application Ser. No. 389,457 filed Aug. 13, 1964, which is incorporated by reference.

This invention relates to fluorescent coatings and to methods of making them and to sensitized films and plates incorporating such fluorescent coatings.

The parent application, Ser. No. 389,457, incorporated herein by reference, describes fluorescent coatings containing a fluorescent organic compound dispersed in a hydrophilic film-forming binder and describes electron-sensitive films and plates which incorporate a layer of such fluorescent coatings.

One of the objects of the present invention is to provide improved fluorescent coatings and to provide novel methods for making such coatings and to provide improved electron-sensitive elements incorporating such improved fluorescent coatings.

The improved coatings, according to the present invention, comprise a dispersion of an organic fluorescent compound in an emulsion-polymerized latex. One of the distinct and important advantages that these improved coatings have over the ball milled dispersions and the solvent dispersed coatings described in the parent application is that the improved coatings can provide equivalent fluorescence from thinner coated films. As a fluorescent overcoat in direct electron-beam recording films, for example, this thinner coating has the advantage that it will produce even less image distortion and speed reduction than did the coatings of our previously described fluorescent coatings. We believe the improved fluorescent efficiency of the new coatings results from more uniform and finer dispersion of the fluorescent material in the coating obtained by means of emulsion-polymerization methods as described below.

Various emulsion-polymerization techniques and products are known in the art. Our invention contemplates use of many of these techniques and products in making our novel coatings. The monomeric components for making an emulsion-polymerized latex are first mixed in solution, which we call the prepolymer solution. This solution is then emulsified in water to form the emulsion for polymerization. With some mixtures, a polymerization initiator or catalyst will be added in the prepolymer solution or in the water vehicle and in most cases a surfactant or emulsifying agent is added to the water to promote emulsification. Polymerization of the monomer components in the disperse phase of the emulsion proceeds after emulsification. In some instances the temperature of the emulsion may be raised to promote polymerization. After polymerization in the emulsion has proceeded to completion, the polymer product remains dispersed as a colloidal dispersion in the water vehicle, constituting a latex product. More detailed descriptions of emulsion-polymerization techniques are available in the literature.

According to the present invention, we prepare a fluorescent coating composition by any of various emulsion-polymerization techniques, but in all cases dissolving in the prepolymer solution of monomeric components, an organic, water-insoluble fluorescent compound. This fluorescent compound does not enter the polymerization reaction but remains in the disperse phase of the emulsion during polymerization. A solution of the prepolymer components and the organic fluorescent compound is emulsified in an aqueous medium and polymerization proceeds as described above. After polymerization, the fluorescent compound remains, finely dispersed, in the polymeric phase of the latex emulsion. In some instances it is preferable to refine the emulsion after polymerization to remove unreacted monomer and other agents that might be undesirable in the coating. The polymer latex is then coated and dried by evaporation to produce a film of the polymer product having dispersed therein an extremely fine dispersion of organic fluorescent compound. For direct electron recording films the fluorescent coating is coated on a support having an electron-beam-sensitive image-forming layer (e.g. photographic silver halide) and, preferably, also having an electrically conductive coating. In some preferred embodiments the fluorescent coating and the conductive coating are coated on the same side of the film support with the sensitive coating; in most preferred embodiments the fluorescent layer is coated over the sensitive layer.

The invention will be further explained by reference to specific examples that describe in detail certain preferred embodiments of the invention.

Example I

Cuprous iodide (2.4 g.) was dissolved in a mixture of 200 ml. methyl ethyl ketone and 4.0 ml. of trimethyl phosphite, then 40 ml. of a 5% solution of a terpolymer poly(methylacrylatevinylidene chloride-itaconic acid) in 90% methyl ethyl ketone and 10% cyclohexanone was added. The solution was filtered and then machine coated by bead application on a subbed polyester film support to give a coverage of 5 mg. of copper per square foot. The coating was dried at 110° C. and then cured at 120° C. for 10 minutes. The coating was clear and surface resistivity was $1.7 \times 10^5$ ohms per square. A protective layer of Vinylite VMCH was solution-coated from a ketone solvent over the conducting layer. This protective coating was dried at 95° C. and cured at 100° C. for four minutes. Over this protective layer a thin subbing of cellulose nitrate (from a 1.4% solution in methanol) was applied to improve adhesion. A gelatin subbing was applied and a gelation-silver halide photographic emulsion of the Lippman type cas coated over the subbing. A fluorescent coating was coated over the sensitive layer of silver halide gelatin emulsion as follows.

A mixture of 100 g. styrene, 0.25 g. of a first organic fluorescent compound, 1,1,4,4-tetraphenylbutadiene, and an 0.8 g. of a second fluorescent compound, 1,4-bis-2-(5-phenyloxazolyl)-benzene was mixed to form a colution. The solution was then added to 400 g. water which contained 2.5 g. Triton X–200E surfactant, alkyl phenoxy polyethoxyethylsulfate, Rohm and Haas Co.) and 0.5% $K_2S_2O_8$ as a polymerization initiator and the solution was emulsified in the water by agitation. Polymerization of the styrene proceeded and a portion of the latex then was coated on the photographic silver halide-gelatin emulsion and dried by evaporation.

Example II

A portion of the polymerized latex emulsion product prepared in Example I was mixed with an equal volume of 20% gelatin aqueous solution and the mixture was coated on an electron-beam sensitive recording element as in Example I.

Example III

The coated elements prepared by Examples I and II were irradiated in a 10 kev. electron beam and both showed excellent scintillation under electron bombardment.

Example IV

One-half g. of a 3-phenyl-7-ureidocoumarin fluorescent compound having the trade name Tinopal SFG (Geigy) and described in Example 3 of British Patent 786,234 to Geigy A.G. was dispersed in a mixture of 33 g. of butylacrylate and 14 g. styrene. This solution, and in addition, 9 g. of 5% succinylated glue were added with stirring to a mixture containing 460 ml. water, 0.29 g. $K_2S_2O_8$, and 1.25 g. Duponol (lauryl sulfate) surfactant. The resulting mixture was stirred at 83–85° C. to produce a very uniform polymer latex of small particle size. After completion of the polymerization, the latex was steam distilled to remove unreacted monomer and volatile components and the latex was further refined by filtering to separate coagulum. The latex was about 20% solids at this stage. The refined latex was coated at a coverage of 200 mg. dry solids per square foot over a conventional subbed polyethylene terephthalate film support having a conductive coating and silver halide emulsion layer as described in Example I. A second coating was prepared by mixing a second portion of the refined latex with an equal portion of gelatin solution, as in Example II, and coating a similar support at a concentration of 100 mg. dry latex solids per square foot and 100 mg. dry gelatin per square foot gelatin. Under 10 kev. electron bombardment in vacuum both coatings showed excellent scintillation output with radiation decay time of less than $10^{-6}$ seconds. We may substitute other 3-phenyl-7-ureidocoumarin fluorescent compounds of the general class described in British Patent 786,234, and we may substitute other alkylacrylate, alkylacrylate-protein, and styrene-alkylacrylate-protein emulsion-polymerized latexes of kinds described in U.S. Patent No. 2,853,382. These are our most preferred coatings.

The invention comprises coating compositions containing a variety of emulsion-polymerized resin binders and containing a variety of water-insoluble organic fluorescent compounds.

We may use, for example, binder comprising emulsion-polymerized resins of the kinds described, for example, in U.S. Patents No. 2,772,166, Nov. 27, 1956, (Wm. F. Fowler), No. 2,831,767, Apr. 22, 1958, (John R. Dann et al.), No. 2,853,457, Sept. 23, 1958, (John W. Gates, Jr., et al.) and No. 2,852,382, Sept. 16, 1958, (Bernard D. Illingsworth et al.). Many other suitable emulsion-polymerization latexes are described in the literature.

Examples of suitable organic fluorescent compounds are those described as "organic fluors" and "organic scintillators," in Organic Scintillation Detectors by E. Schram and R. Lombaert, Elsvier 1963. Examples of some specific organic water-insoluble fluorescent compounds that we have used are Tinopal SFG, p-terphenyl, p-quaterphenyl, anthracene, 20% Fluolite casein, tetraphenyl butadiene, Blancophor AW, triazinyl-stilbenes such as those described in McFall et al. U.S. Patent No. 2,933,390, bis(8-hydroxyquinolino)-magnesium, tris (4,4,4-trifluoro-1-)-2-(thienyl-1,3-butanediono)-europium, Leucophor B and coumarins such as those described in British Patent No. 786,234.

These compounds are mentioned only as examples, and the invention comprises use of many other organic, water-insoluble fluorescent compounds and mixtures thereof.

The invention comprises use of mixtures of emulsion-polymerized resins containing the fluorescent compound in combination with other hydrosol-type binders, e.g., gelatin, polyvinyl alcohol, etc. The invention comprises use of mixtures of organic fluorescent compounds, as well as single ones, in the coating. Concentration of the organic fluorescent compounds in the coating is not a critical aspect of the invention. The coatings can carry high concentrations of organic fluors without undesirable coagulation or local concentration of the fluorescent compound as the coating dries. Useful concentrations may range from less than 1% to as high as 12–15% of organic fluor in the finished coating. This advantage is believed attributable to the extremely fine distribution obtained by our emulsion-polymerization process. It seems that the prepolymer solution containing the organic fluor in solution forms a polymeric lattice upon polymerization and this lattice holds the dispersed fluor in molecular or near molecular dispersion even after the resin coating has dried, which may account for the excellent properties of these coatings.

Certain embodiments of the invention, namely those that employ a gelatin-compatible latex product, are particularly advantageous for making fluorescent coatings for use in photographic elements because of their excellent adhesion to gelatin coatings such as gelatian-silver halide emulsions coatings, gelatin subbings, filter layers and the like.

Fluorescent coatings prepared according to the invention are useful, in addition to their use in electron-beam recording films, for making fluorescent layers on X-ray monitoring films, incorporated-screen X-ray films, etc. They are also useful for making optically multicolored photographic papers. Generally, fluorescent coatings according to the invention are useful in many applications that require a fluorescent film coated on a support surface.

It will be understood that modifications and variations may be made within the scope of the invention as described above and as defined in the following claims.

I claim:

1. A method of making a photographic element comprising the steps of
   (a) dissolving an organic, water insoluble fluorescent compound in solution with monomeric prepolymerization components for making an emulsion-polymerized latex product, and
   (b) dispersing the solution so made in an aqueous emulsion under conditions to promote emulsion polymerization of said monomeric components, and
   (c) polymerizing said components under said conditions forming a latex product having an extremely fine particulate dispersion of said fluorescent compound in the polymer phase of said latex product, and
   (d) coating and drying said latex product forming an integral fluorescent layer in a photographic element.

2. A method defined in claim 1 wherein said polymer phase of said latex product is compatible with gelatin in aqueous solution and wherein said latex product is coated and dried with gelatin in solution in the aqueous phase of said latex product.

3. A method defined by claim 1 wherein said polymer phase of said latex product consists essentially of an emulsion polymerized styrene-butylacrylate copolymer.

4. A method defined by claim 1 wherein said polymer phase of said latex product consists essentially of an emulsion polymerized polystyrene resin.

5. A method defined by claim 1 wherein said polymer phase of said latex product consists essentially of an emulsion-polymerized alkylacrylate polymeric resin.

6. A method defined by claim 5 wherein said water-insoluble fluorescent compound is 3-phenyl-7-ureidocoumarin fluorescent compound.

7. A method defined by claim 1 wherein said polymer phase of said latex product consists essentially of an emulsion-polymerized styrene-alkylacrylate polymeric resin.

8. A method defined by claim 1 wherein said polymer phase of said latex product consists essentially of an emulsion-polymerized alkylacrylate-protein polymeric resin.

9. A method defined by claim 8 wherein said water-insoluble fluorescent compound is a 3-phenyl-7-ureidocoumarin fluorescent compound.

10. A method defined by claim 1 wherein said polymer phase of said latex product consists essentially of an emulsion-polymerized styrene-alkylacrylate-protein polymeric resin.

11. A method defined by claim 10 wherein said water-insoluble compound is a 3-phenyl-7-ureidocoumarin derivative.

References Cited

UNITED STATES PATENTS 3,303,341   2/1967   Fram et al. _____ 96—82

FOREIGN PATENTS 646,150   7/1964   Belgium.
786,234   11/1957   Great Britain.

NORMAN G. TORCHIN, *Primary Examiner.*

CAROLYN DAVIS, *Assistant Examiner.*